(12) United States Patent
Beatty et al.

(10) Patent No.: US 8,136,770 B2
(45) Date of Patent: Mar. 20, 2012

(54) MOUNT FOR EXHAUST SYSTEM COMPONENTS

(75) Inventors: Scott A. Beatty, La Grange, IL (US); Gregory A. Griffin, Glendale Heights, IL (US); Ivan M. Lazich, Skokie, IL (US); Luis Carlos Cattani, Aurora, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 388 days.

(21) Appl. No.: 12/546,372

(22) Filed: Aug. 24, 2009

(65) Prior Publication Data

US 2011/0042546 A1 Feb. 24, 2011

(51) Int. Cl.
*F16L 3/00* (2006.01)
(52) U.S. Cl. ............... 248/58; 24/545; 24/555; 24/563
(58) Field of Classification Search .............. 248/58, 248/60, 62, 74.1, 74.2, 74.3, 603; 24/545, 24/555, 563; 267/136
See application file for complete search history.

(56) References Cited

U.S. PATENT DOCUMENTS

| 3,913,187 | A | * | 10/1975 | Okuda ..................... 24/484 |
| 4,267,995 | A | * | 5/1981 | McMillan .................. 248/74.1 |
| 4,998,592 | A | | 3/1991 | Londt et al. |
| 5,188,319 | A | | 2/1993 | Hawash et al. |
| 5,242,146 | A | | 9/1993 | Tecco et al. |
| 5,366,246 | A | | 11/1994 | Chen et al. |
| 5,484,123 | A | | 1/1996 | Logan |
| 5,603,549 | A | | 2/1997 | Chen et al. |
| 6,082,715 | A | | 7/2000 | Vandermolen |
| 6,120,082 | A | | 9/2000 | Vandermolen |
| 6,126,119 | A | * | 10/2000 | Giangrasso ................. 248/58 |
| 6,158,774 | A | | 12/2000 | Mink |
| 6,168,122 | B1 | | 1/2001 | Lobsiger et al. |
| 6,282,975 | B1 | | 9/2001 | Harrison et al. |
| 6,286,638 | B1 | | 9/2001 | Rowan et al. |
| 6,378,640 | B1 | | 4/2002 | Dewey et al. |
| 6,408,974 | B1 | | 6/2002 | Viduya et al. |
| 6,450,736 | B1 | * | 9/2002 | Eck et al. ................. 405/184.4 |
| 6,463,818 | B1 | | 10/2002 | Stagg et al. |
| 6,554,232 | B1 | | 4/2003 | Macris |
| 6,584,949 | B1 | | 7/2003 | Franchi et al. |
| 7,043,915 | B2 | | 5/2006 | Anello |
| 7,207,527 | B2 | * | 4/2007 | Opperthauser ............... 248/55 |
| 7,243,883 | B2 | | 7/2007 | Judd et al. |
| 7,520,475 | B2 | * | 4/2009 | Opperthauser ............... 248/71 |
| 7,523,736 | B2 | | 4/2009 | Rammer et al. |
| 7,562,528 | B2 | | 7/2009 | Wood |
| 7,762,503 | B2 | * | 7/2010 | Franks .................... 248/71 |
| 2001/0038059 | A1 | | 11/2001 | Dick et al. |
| 2005/0109890 | A1 | * | 5/2005 | Korczak et al. ............ 248/74.1 |
| 2005/0211853 | A1 | * | 9/2005 | Whorton .................... 248/71 |
| 2006/0220384 | A1 | * | 10/2006 | Quackenbush et al. ....... 285/408 |

(Continued)

*Primary Examiner* — Ramon Ramirez
(74) *Attorney, Agent, or Firm* — Mark C. Bach; Jeffrey P. Calfa

(57) ABSTRACT

A mount (50) for mounting an exhaust gas component (30, 32, 16) in an exhaust pipe (34) or in a component housing includes a spring band (54) and a plurality of spring fingers (64). The spring band (54) is configured to contact and substantially pass around an outer surface (52) of the exhaust gas component (30, 32, 16). The plurality of spring fingers (64) extend from the spring band (54) generally axially with respect to the exhaust gas component (30, 32, 16) and generally radially from the spring band. The spring fingers (64) contact the exhaust gas component (30, 32, 16).

19 Claims, 2 Drawing Sheets

U.S. PATENT DOCUMENTS

| | | |
|---|---|---|
| 2007/0023585 A1 | 2/2007 | Judd et al. |
| 2009/0095860 A1 | 4/2009 | Yoon et al. |
| 2009/0095875 A1 | 4/2009 | Anello |
| 2009/0140108 A1 | 6/2009 | Faied |

* cited by examiner

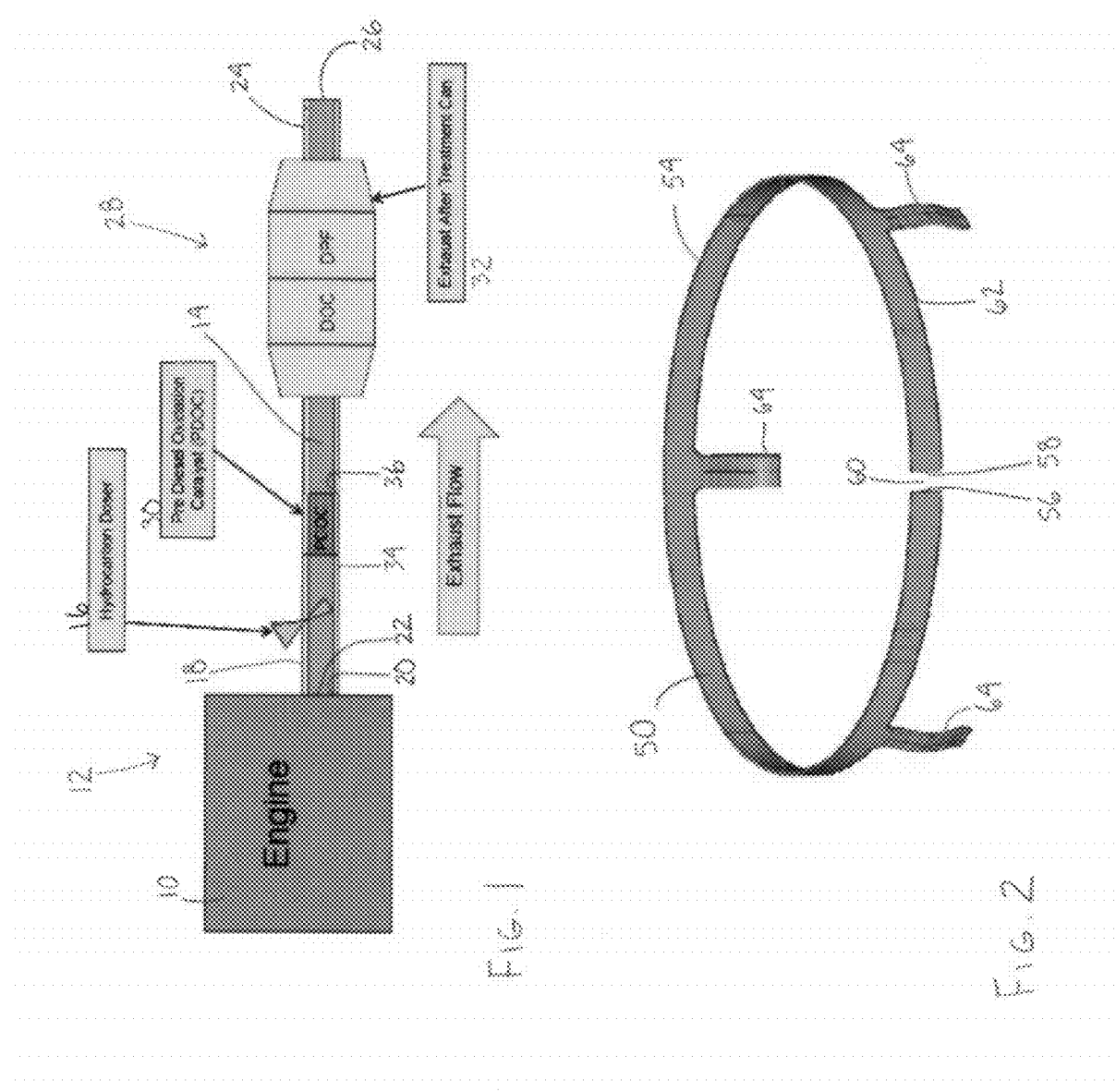

MOUNT FOR EXHAUST SYSTEM COMPONENTS

BACKGROUND

Embodiments described herein relate to exhaust systems. More particularly, embodiments described herein relate to mounts for mounting components in an exhaust system.

An exhaust system associated with an engine includes an exhaust gas passageway for emitting the exhaust gases from the engine to the ambient. In the direction of flow of the exhaust gases on the exhaust gas passageway, the exhaust system may have a hydrocarbon doser, a pre-diesel oxidation catalyst (PDOC), a diesel oxidation catalyst/diesel particulate filter (DOC/DPF), a catalyst, an exhaust gas recirculation (EGR) cooler, and may include other components, or components in varying locations on the exhaust gas passageway. Some of these components are mounted in an exhaust pipe, and as a result, may be mounted in a way to permit the thermal expansion of the components within the exhaust pipe. Further, the components are susceptible to vibration and resonance through contact with the exhaust pipe.

Oscillating objects have a natural frequency, which is the frequency that the oscillating object tends to settle into if the object is not disturbed. The phenomenon in which a relatively small, repeatedly applied force causes the amplitude of an oscillating system to become very large is called resonance.

Exhaust systems have a natural frequency at which the exhaust system tends to vibrate. This natural frequency can be attributed to the physical shape and dimension of the exhaust system. The natural frequency of an exhaust system is primarily dictated by its length, which is functional in nature and cannot be altered substantially.

During on road operation of a vehicle, the exhaust system receives vibration pulses; for example, from engine combustion and road irregularities which substantially increase the rate at which the exhaust system is vibrating. Furthermore, the incoming vibration pulses received by an exhaust system can be at or near the natural frequency of the exhaust system, which causes the exhaust system to approach and sometimes reach resonance. The exhaust system reaching resonance can result in the destruction of the exhaust system.

The force that causes vibrations or oscillation to stop is called damping. If the proper damping mechanism is utilized, reaching resonance can be avoided. The most common damping mechanism used with exhaust systems is the incorporation of thermal blankets wrapped around the components. Other past efforts to increase the longevity of the exhaust systems have been directed to increasing the stiffness of the system sufficiently to reduce vibrations to within acceptable amplitudes.

SUMMARY OF THE INVENTION

A mount for mounting an exhaust gas component in an exhaust pipe or in a component housing includes a spring band and a plurality of spring fingers. The spring band is configured to contact and substantially pass around an outer surface of the exhaust gas component. The plurality of spring fingers extend from the spring band generally axially with respect to the exhaust gas component and generally radially from the spring band. The spring fingers contact the exhaust gas component.

BRIEF DESCRIPTION OF THE DRAWINGS

FIG. 1 is a schematic diagram of an engine having an exhaust system with a hydrocarbon doser, a pre-diesel oxidation catalyst and a diesel oxidation catalyst/diesel particulate filter.

FIG. 2 is a perspective view of a mount.

DETAILED DESCRIPTION

Figure 3:
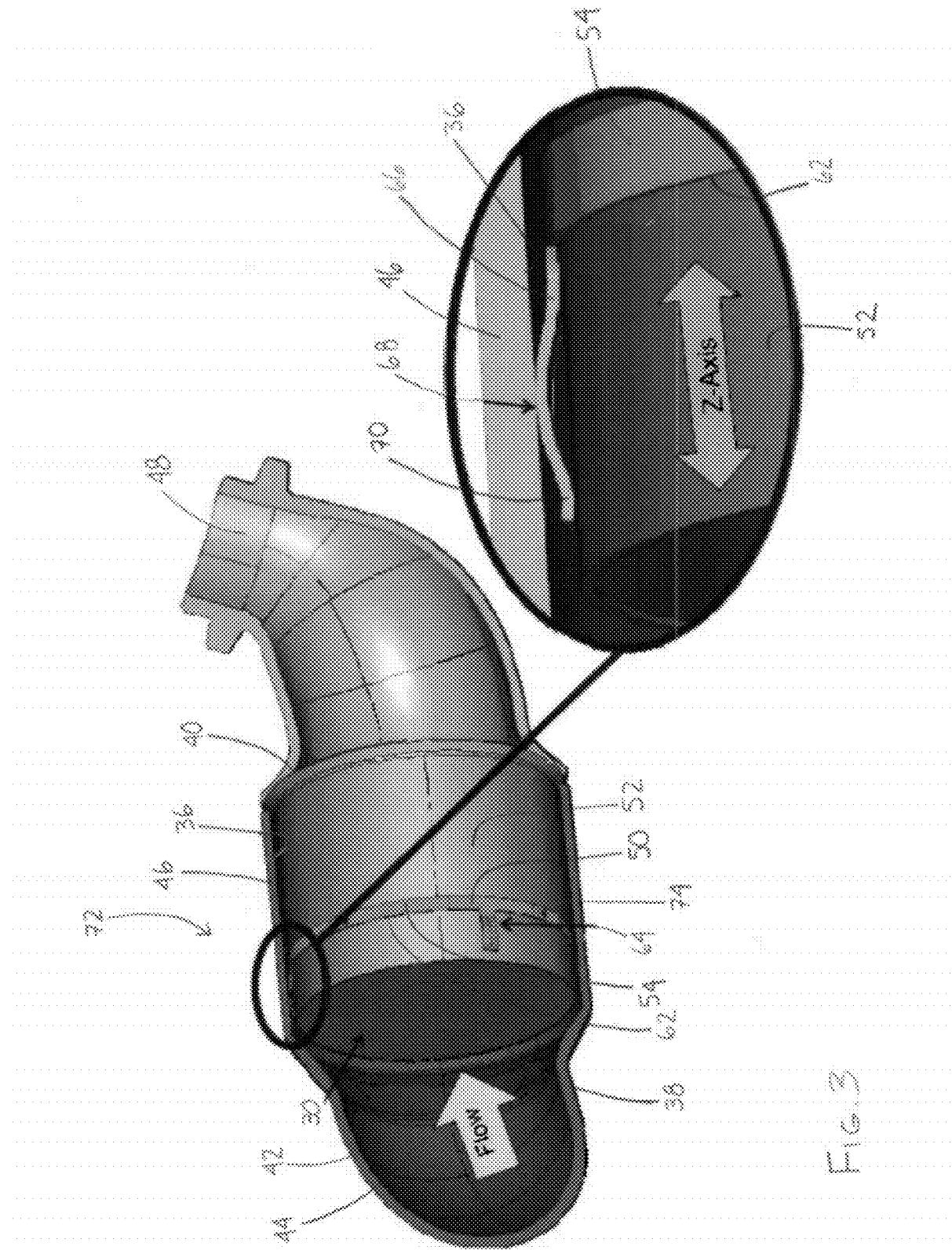
FIG. 3 is a partial section view and a detail view of the mount on a pre-diesel oxidation catalyst mounted within an exhaust pipe.

Referring FIG. 1, a schematic diagram of an engine 10 having an exhaust system, generally shown at 12, includes an exhaust gas passageway 14 for emitting the exhaust gases from the engine 10. A hydrocarbon doser 16 is in fluid communication with the exhaust gas passageway 14 for spraying a hydrocarbon into the exhaust system 12.

The exhaust gas passageway 14 is formed with an exhaust inlet pipe 18, having an inlet 20 connected to an exhaust outlet 22 of the engine 10, and an exhaust outlet pipe 24, having an outlet 26 for venting the exhaust gases to the atmosphere. In the direction of flow of the exhaust gases on the exhaust gas passageway 14, the exhaust system 12 has an after treatment system 28, including a pre-diesel oxidation catalyst (PDOC) 30, and a diesel oxidation catalyst/diesel particulate filter (DOC/DPF) 32 downstream of the PDOC.

As shown in FIG. 1, the PDOC 30 is mounted in an exhaust pipe 34 having an inside pipe wall 36. While only the PDOC 30 is mounted in the exhaust pipe 34 in the embodiment shown, in another embodiment other components may also be mounted within the exhaust pipe, including but not limited to hydrocarbon dosers, DOCs, DPFs, and EGR coolers. The description below will be directed to mounting of the PDOC 30 in the exhaust pipe 34, however it should be appreciated that the invention can be applied to other components located in the exhaust system 12.

Referring now to FIG. 2 and FIG. 3, the PDOC 30 is generally cylindrical having an inlet end 38 and an outlet end 40, and an axis Z extending therebetween. In one embodiment, the outlet end 40 does not have an outwardly extending lip, while in another embodiment, the outlet end 40 has an outwardly extending lip. At the inlet end 38, a front casting 42 directs the flow of exhaust gas through the PDOC 30. The front casting 42 has a first portion 44 upstream of the PDOC 30 and a second portion 46 that circumscribes the PDOC 30. A rear casting 48 extends from the outlet end of the PDOC 30. Together, the front casting 42 and the rear casting 48 form the exhaust pipe 34 within which the PDOC 30 is mounted in sealed fluid communication with the exhaust gas passageway 14.

A mount 50 is disposed radially about an outer surface 52 of the PDOC 30. While only the PDOC 30 is shown in FIG. 3 with the mount 50, in another embodiment, other components can be mounted to the exhaust pipe 34 or to their respective component housings using a mount, including but not limited to a hydrocarbon doser, a DOC, a DPF, and a EGR cooler, among others. Further, while the mount 50 is generally circular to correspond to the generally cylindrical outer surface 52 of the PDOC 30, in another embodiment, the mount can be any geometrical shape that corresponds to the outer surface of the component that is mounted.

The mount 50 includes a generally thin ring or spring band 54, preferably made of metal, disposed around the PDOC 30 and having an inside diameter slightly larger than the outside diameter of the PDOC 30. The spring band 54 is configured to be generally co-axial with the axis Z of the PDOC 30. The spring band 54 has a first end 56, a second end 58 and a gap 60 between the first and second ends. The gap 60 allows the expansion of the spring band 54 in the radial direction to accommodate variations in PDOC 30 diameter, expansion of the PDOC, and for ease of placing the spring band around the PDOC.

On a first side 62 of the spring band 54, at least one spring finger 64 extends generally axially and radially outward from the spring band 54. The spring band 54 has a plurality of spring fingers 64 that are generally evenly spaced about the spring band and that are configured for contacting the PDOC 30 at a plurality of locations. In the spring band 54, there are three spring fingers 64, however other numbers are contemplated. The spring fingers 64 generally extend along an outer surface 52 of the PDOC 30.

Each spring finger 64 provides additional radial stiffness to counter displacement of the PDOC 30 in the plane transverse to the axis Z, and that does not restrict thermal growth along the axis Z. Additionally, other spring fingers 64 are contemplated, such as incorporating different mechanical springs, or employing material with differing modulus of elasticity.

As best seen in the detail view, each spring finger 64 has a first portion 66, a contact portion 68, and a third portion 70. The first portion 66 extends from the spring band 54, the contact portion 68 extends from the first portion 66 and contacts the inside pipe wall 36 of the front casting 42, and the third portion 70 extends from the contact portion 68 to the PDOC 30. The first portion 66 and the third portion 70 apply pressure to the side of the PDOC 30. It should be noted that although the spring fingers 64 are depicted as having the same structure, it is contemplated that different finger structures may be incorporated.

The spring fingers 64 are integrally formed with the spring band 54, and the spring fingers are metal, although other similar relatively resilient materials and constructions are contemplated. Additional materials could be added to increase the friction between the spring finger 64, the PDOC 30 and the inside pipe wall 36 of the front casting 42.

The front casting 42 and the PDOC 30 mounted within the front casting with the mount 50 form a pre-diesel oxidation catalyst assembly, indicated generally at 72. The spring fingers 64 have generally the same modulus of elasticity and are configured to maintain a generally constant perimeter space between the PDOC 30 and the exhaust pipe 34 such that the exhaust pipe circumscribes the PDOC. The spring finger 64 provides increased radial stiffness that counters the vibrational movements of the PDOC 30 in the plane transverse to the axis Z to prevent the exhaust system 12 from reaching resonance. Further, the shape of the spring finger 64 provides ease of assembly of the PDOC assembly 72 in that the spring finger can deform while the PDOC 30 and the mount 50 are positioned within the front casting 42.

The mount 50 is attached to the PDOC 30 with spot welds 74, however other methods are contemplated. The mount 50 can be mechanically retained by a friction fit with the PDOC 30 or can be located between mechanical stops on the PDOC, among other attachment apparatus and methods.

What is claimed is:

1. A mount for mounting an exhaust gas component in an exhaust pipe or in a component housing, the mount comprising:
a spring band configured to contact and substantially pass around an outer surface of the exhaust gas component; and
a plurality of spring fingers extending from the spring band generally axially with respect to the exhaust gas component and generally radially from the spring band, wherein the plurality of spring fingers contact the exhaust gas component and an inside pipe wall of the exhaust pipe to locate the exhaust gas component within the exhaust pipe.

2. The mount of claim 1 wherein the plurality of spring fingers are evenly spaced on the spring band.

3. The mount of claim 1 wherein the spring band is generally ring-shaped having a first end and a second end defining a gap between the first end and the second end.

4. The mount of claim 1 wherein the plurality of spring fingers have a first portion extending from the spring band, a contact portion that extends from the first portion and contacts the inside wall of the exhaust pipe, and a third portion that extends from the contact portion to the exhaust gas component.

5. The mount of claim 1 wherein the plurality of spring fingers are integrally formed with the spring band.

6. The mount of claim 1 wherein the plurality of spring fingers are formed of metal.

7. A mount for mounting an exhaust gas component in an exhaust pipe or in a component housing, the mount comprising:
a spring band configured to contact and substantially pass around an outer surface of the exhaust gas component; and
a plurality of spring fingers extending from the spring band generally axially with respect to the exhaust gas component and generally radially from the spring band, wherein the plurality of spring fingers contact the exhaust gas component and an interior surface of the component housing to locate the exhaust gas component within the component housing.

8. The mount of claim 7 wherein the plurality of spring fingers have a first portion extending from the spring band, a contact portion that extends from the first portion and contacts the component housing, and a third portion that extends from the contact portion to the exhaust gas component.

9. A mount for mounting a generally cylindrical exhaust gas component in an exhaust pipe forming an axis, the mount comprising:
a generally ring-shaped spring band configured to contact and substantially pass around a cylindrical outer surface of the exhaust gas component; and
a plurality of spring fingers extending from the spring band generally parallel to the axis and generally radially from the spring band, wherein the spring fingers contact the exhaust gas component and an inside wall of the exhaust pipe such that the exhaust pipe generally circumscribes the exhaust gas component.

10. The mount of claim 9 wherein the plurality of spring fingers are evenly spaced around the spring band.

11. The mount of claim 9 wherein the spring band is generally ring-shaped having a first end and a second end defining a gap between the first end and the second end.

12. The mount of claim 9 wherein the plurality of spring fingers have a first portion extending from the spring band, a contact portion that extends from the first portion and contacts the inside wall of the exhaust pipe, and a third portion that extends from the contact portion to the exhaust gas component.

13. A pre-diesel oxidation catalyst assembly for an exhaust system of a vehicle, the assembly comprising:
a casting having an inside wall;
a pre-diesel oxidation catalyst disposed within the casting;
a mount for mounting the pre-diesel oxidation catalyst in the casting, the mount comprising:

a spring band configured to contact and substantially pass around an outer surface of the pre-diesel oxidation catalyst; and a plurality of spring fingers extending from the spring band generally axially with respect to the pre-diesel oxidation catalyst and generally radially from the spring band, wherein the spring fingers contact the pre-diesel oxidation catalyst and the inside wall of the front casting.

14. The pre-diesel oxidation catalyst assembly of claim 13 wherein the plurality of spring fingers have a first portion extending from the spring band, a contact portion that extends from the first portion and contacts the inside wall of the exhaust pipe, and a third portion that extends from the contact portion to the exhaust gas component.

15. The pre-diesel oxidation catalyst assembly of claim 13 wherein the casting has a first portion upstream of the pre-diesel oxidation catalyst and a second portion that circumscribes the pre-diesel oxidation catalyst.

16. The pre-diesel oxidation catalyst assembly of claim 13 wherein the spring band is spot welded to the pre-diesel oxidation catalyst.

17. The pre-diesel oxidation catalyst assembly of claim 13 wherein the spring band is mechanically retained on the pre-diesel oxidation catalyst.

18. The pre-diesel oxidation catalyst assembly of claim 13 wherein the spring band is generally ring-shaped having a first end and a second end defining a gap between the first end and the second end.

19. The pre-diesel oxidation catalyst assembly of claim 13 wherein the spring band and the spring fingers are integrally formed of metal, and wherein the spring fingers are disposed in generally equal intervals on the spring band.

* * * * *